(12) United States Patent
Usui (10) Patent No.: US 9,015,385 B2
(45) Date of Patent: Apr. 21, 2015

(54) DATA STORAGE DEVICE AND METHOD OF CONTROLLING DATA STORAGE DEVICE

(71) Applicant: Fujitsu Limited, Kawasaki-shi, Kanagawa (JP)

(72) Inventor: Kazuhiko Usui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 14 days.

(21) Appl. No.: 13/918,264

(22) Filed: Jun. 14, 2013

(65) Prior Publication Data
US 2014/0052947 A1    Feb. 20, 2014

(30) Foreign Application Priority Data

Aug. 20, 2012   (JP) ................. 2012-181668

(51) Int. Cl.
*G06F 3/06*     (2006.01)
*G06F 3/00*     (2006.01)
*G06F 13/38*    (2006.01)

(52) U.S. Cl.
CPC .............. *G06F 3/065* (2013.01); *G06F 3/0614* (2013.01); *G06F 3/067* (2013.01); *G06F 3/00* (2013.01); *G06F 13/385* (2013.01); *G06F 3/0604* (2013.01); *G06F 3/0683* (2013.01)

(58) Field of Classification Search
CPC ................................. G06F 13/385; G06F 3/00
See application file for complete search history.

(56) References Cited

U.S. PATENT DOCUMENTS

| 7,904,906 | B2 * | 3/2011 | Puthukattukaran et al. .. 718/102 |
| 2003/0028515 | A1 | 2/2003 | Nishikado et al. |
| 2004/0103247 | A1 | 5/2004 | Bita et al. |

FOREIGN PATENT DOCUMENTS

| JP | 2003-141070 | 5/2003 |
| JP | 2003-173240 | 6/2003 |
| JP | 2004-171437 | 6/2004 |
| JP | 2008-225699 | 9/2008 |

* cited by examiner

*Primary Examiner* — Zachary K Huson
(74) *Attorney, Agent, or Firm* — Staas & Halsey LLP (57) ABSTRACT

A data storage device includes a processor or hardware circuit. The processor or hardware circuit copies data stored in regions of a copy source volume to a copy destination volume. The processor or hardware circuit sets up in a memory a management table for the regions. The management table includes first information and second information. The first information indicates whether a bitmap has been set up. The bitmap represents a state of progress of the copy. The second information specifies a bit value to be used when setting up the bitmap. The processor or hardware circuit sets up in the memory the bitmap corresponding to the regions on the basis of the second information.

6 Claims, 8 Drawing Sheets

DATA STORAGE DEVICE AND METHOD OF CONTROLLING DATA STORAGE DEVICE

CROSS-REFERENCE TO RELATED APPLICATION

This application is based upon and claims the benefit of priority from the prior Japanese Patent Application No. 2012-181668 filed on Aug. 20, 2012, the entire contents of which are incorporated herein by reference.

FIELD

The embodiments discussed herein are related to a data storage device and a method of controlling a data storage device.

BACKGROUND

For storage devices and the like, known examples of techniques for creating a copy of data include snapshot and mirroring techniques. In snapshot, a storage device logically creates a copy of a disk image instantly, and physically copies updated regions at a time when disk access is performed. This copying method is called "copy-on-write". In snapshot, sometimes the storage device copies the entire data image in the background simultaneously with execution of the copy-on-write.

Mirroring is a technique in which updates made to a copy source volume are continuously transferred to a copy destination volume so that the contents of the copy source volume and the contents of the copy destination volume remain substantially the same. In mirroring, the storage device halts transfer from the copy source with a detach command (detach in duplexing) and then creates a copy of the copy source volume, which existed at the time when that command was issued, in the copy destination volume.

In order to support these techniques, sometimes a data image is divided into regular sections and whether or not copying has been completed is recorded for each of the sections. Data indicating whether or not copying has been completed in such a way is called a bitmap.

A copy creation device that performs copy creation processing using a bitmap is known. This copy creation device sets up a bitmap indicating whether copying to a copy destination volume has been performed or not for every predetermined region of the data of the copy source volume.

Japanese Laid-open Patent Publication No. 2008-225699 discloses a related technique.

However, in the above-described copy creation device, a bitmap has to be set up for each predetermined region of data of the copy source volume and a lot of resources may be used to set up such bitmaps.

SUMMARY

According to an aspect of the present invention, provided is a data storage device including a processor or hardware circuit. The processor or hardware circuit copies data stored in regions of a copy source volume to a copy destination volume. The processor or hardware circuit sets up in a memory a management table for the regions. The management table includes first information and second information. The first information indicates whether a bitmap has been set up. The bitmap represents a state of progress of the copy. The second information specifies a bit value to be used when setting up the bitmap. The processor or hardware circuit sets up in the memory the bitmap corresponding to the regions on the basis of the second information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereafter, an embodiment will be described with reference to the appended drawings.

Embodiment

Hereafter, an embodiment of a data storage device and a method of controlling a data storage device will be described with reference to the drawings.

Figure 1:
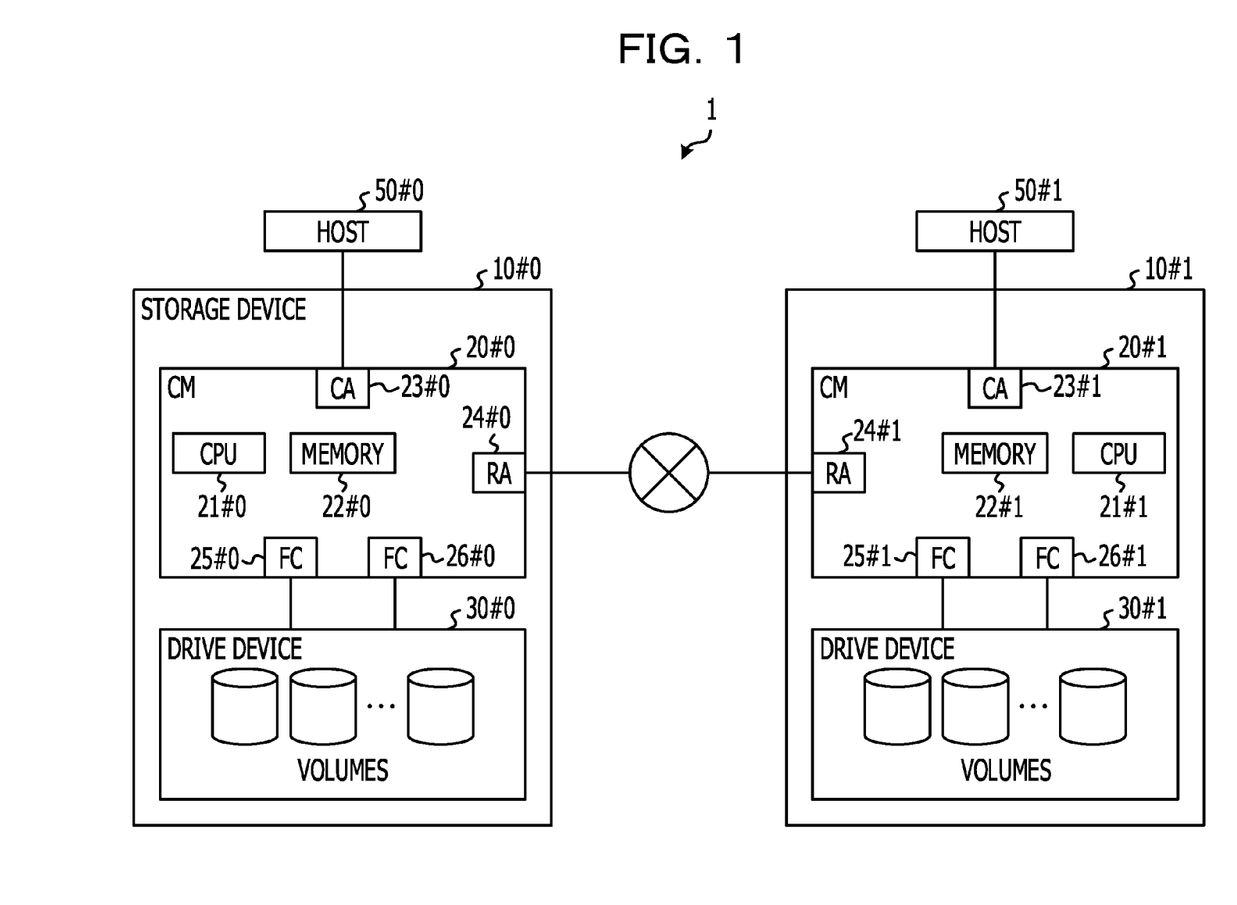
FIG. 1 illustrates an exemplary configuration of a storage system according to an embodiment.

FIG. 1 illustrates an exemplary configuration of a storage system according to the embodiment. A storage system 1 has a configuration in which storage devices 10#0 and 10#1 are connected to each other. The storage devices for example have a similar configuration and therefore, in the following description, description will only be given of the storage device 10#0 and the symbols #0 and #1 indicating the individual storage devices will be omitted. There is no particular limitation on the number of storage devices 10 and any number of storage devices 10 may be provided and storage devices of an individual type rather than a distributed type may be adopted.

Each storage device 10 includes a controller module (CM) 20 and a drive device 30.

The controller module 20 includes a central processing unit (CPU) 21, a memory 22, a channel adapter (CA) 23, a remote adapter (RA) 24 and fibre channels (FCs) 25 and 26.

The CPU 21 allows the controller module 20 to operate by executing firmware to realize processing described below.

The memory 22 is used as a cache memory and also used for a bitmap 22A (described later), a management table 22B (described later) and so forth. The CA 23 is an interface control unit for an interface with a host 50, which is a host computer connected to the storage device 10. The RA 24 is an interface control unit for an interface with another storage device 10 connected via a network or a dedicated line. The FCs 25 and 26 are interface control units for interfaces with the drive device 30.

The drive device 30 is for example a hard disk drive (HDD), a solid state drive (SSD), an optical disk drive or a tape device and a plurality of volumes are set up therein.

In the following description, it will be assumed that volumes Vol_A and Vol_B are set up in the drive device 30 and that Vol_A is used as a work volume and Vol_B is used as a backup volume for the Vol_A. The work volume and the backup volume do not have to be installed in the same storage device 10 and for example the work volume may be installed in the storage device 10#0 and the backup volume may be installed in the storage device 10#1.

Figure 2A:
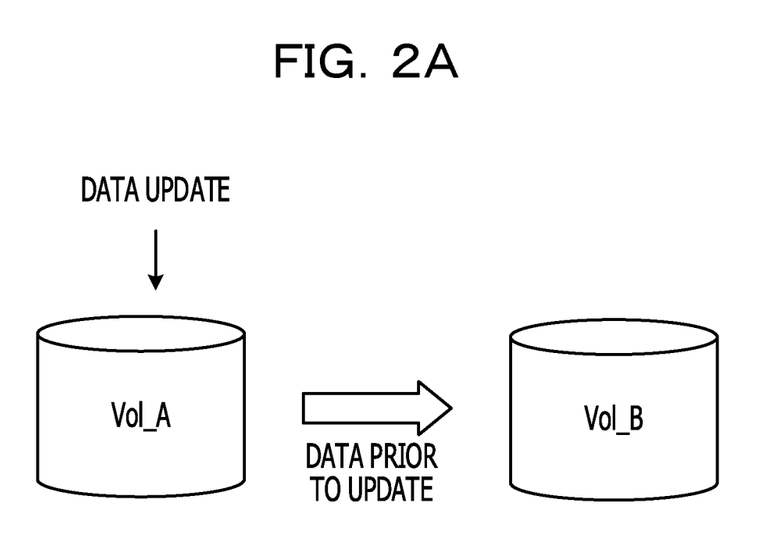
FIG. 2A illustrates a situation in which contents of Vol_A are copied to Vol_B by snapshot.
Figure 2B:
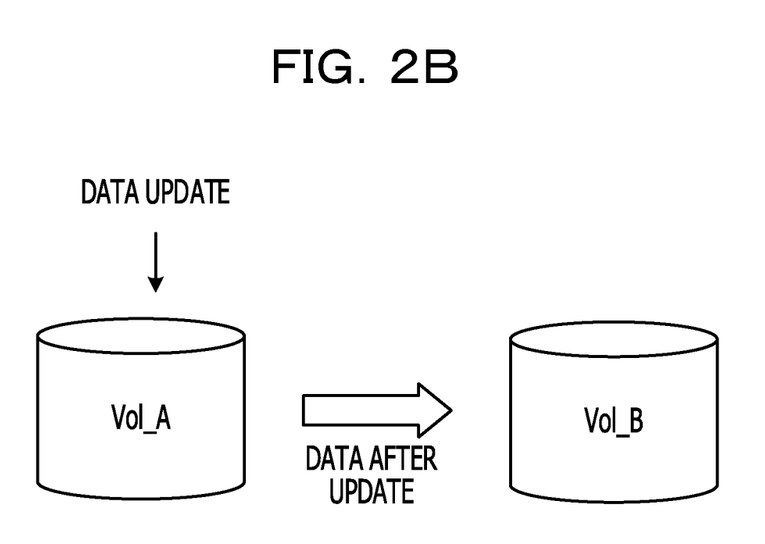
FIG. 2B illustrates a situation in which contents of Vol_A are copied to Vol_B by mirroring.

Examples of backup methods include snapshot and mirroring as described above. In the case where backup is performed by snapshot, the storage device 10 copies, when the contents of Vol_A is updated upon snapshot being instructed, the contents of Vol_A prior to the update to Vol_B. In contrast, in the case where backup is performed by mirroring, the storage device 10 copies, when the contents of Vol_A is updated, the contents of Vol_A after the update to Vol_B. FIG. 2A illustrates a situation in which the contents of Vol_A are copied to Vol_B by snapshot. FIG. 2B illustrates a situation in which the contents of Vol_A are copied to Vol_B by mirroring.

Figure 3:
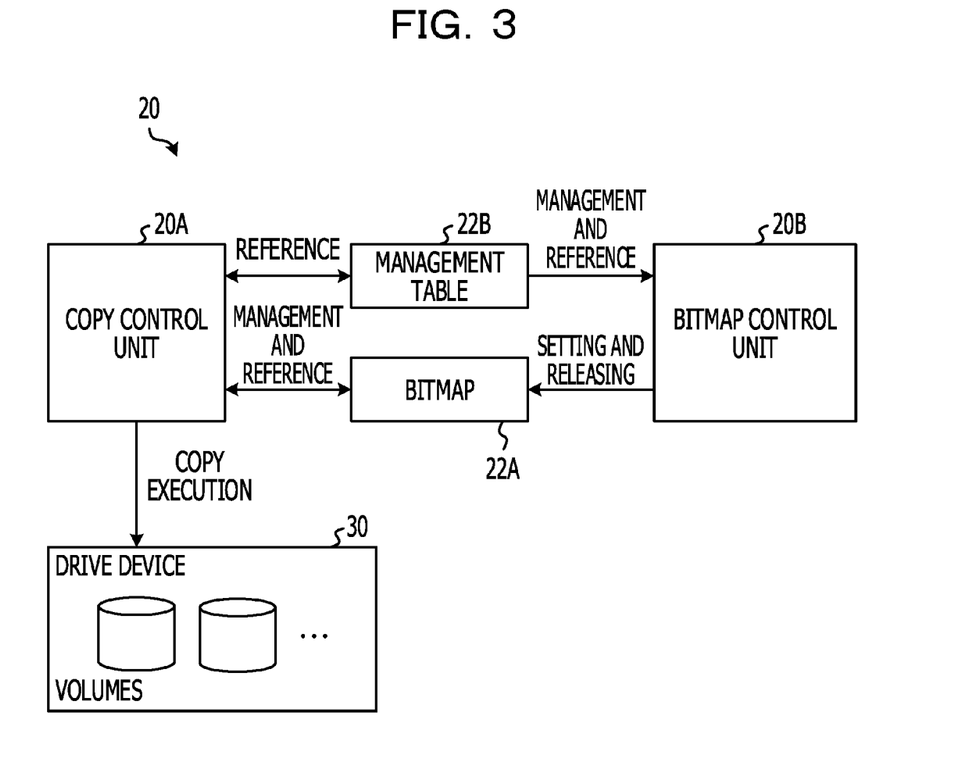
FIG. 3 illustrates an exemplary functional configuration of a controller module.

FIG. 3 illustrates an example of a functional configuration of the controller module 20. The controller module 20 includes a copy control unit 20A and a bitmap control unit 20B as functional blocks that function as a result of the CPU 21 executing firmware stored in a storage device, which is not illustrated. These functional blocks do not have to be executed by clearly separate programs and may be called by another program as a sub-routine or a function. In addition, the functional blocks may be partly in the form of hardware such as a large scale integration (LSI) circuit, an integrated circuit (IC) or a field programmable gate array (FPGA). A bitmap 22A and a management table 22B are set up as appropriate in the memory 22 of the controller module 20.

Figure 4:
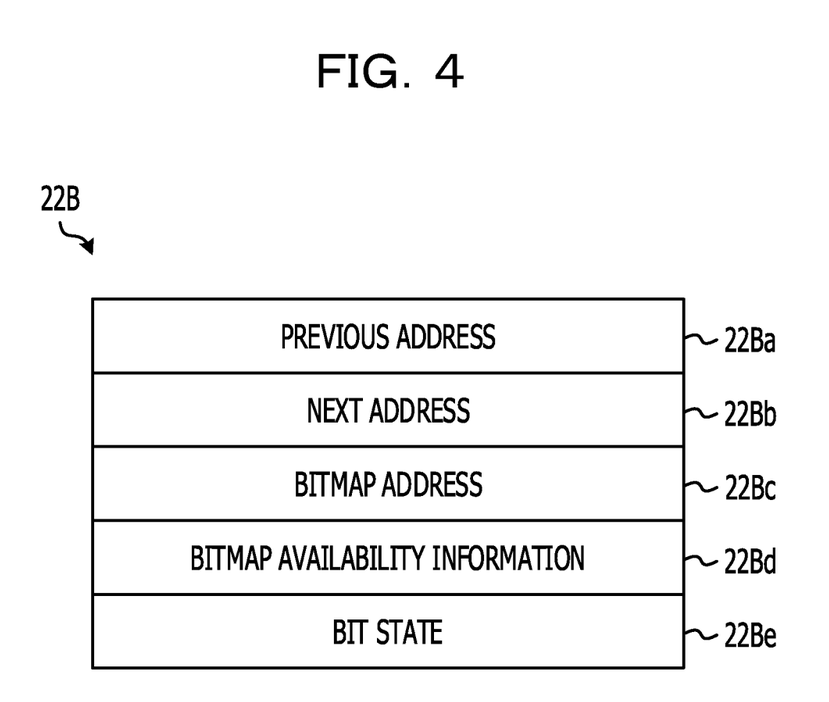
FIG. 4 illustrates an example of a management table created by a bitmap control unit.

FIG. 4 illustrates an example of a management table 22B created by the bitmap control unit 20B. The management table 22B, for example, includes a previous address 22Ba, a next address 22Bb, a bitmap address (start address) 22Bc, bitmap availability information 22Bd, and bit state 22Be.

The previous address 22Ba and the next address 22Bb of the management table 22B are for a case in which a plurality of management tables 22B are set up for one copy session. A management table 22B is set up as a table that corresponds to a copy block group formed of a plurality of copy blocks within a volume, each copy block corresponding to a single bit of a bitmap 22A. A copy block corresponding to one bit of the bitmap 22A is a data block of a size set in accordance with a resolution specified by for example the host 50. A copy block group managed by one management table 22B is a group of copy blocks with consecutive addresses.

A bitmap 22A is similarly set up as a bitmap corresponding to a copy block group. The bitmap 22A is a data region including a plurality of bits and each bit of the bitmap 22A corresponds to a copy block. Each bit of the bitmap 22A represents with a bit value (1 or 0) whether copying of a corresponding copy block has been performed. A bit value of 1 for example indicates that copying has not been performed and a bit value of 0 indicates that copying has been performed.

"Copying" in the storage device 10 is performed in an initial stage in which all of the contents of Vol_A are initially copied to Vol_B as a backup and in a normal stage in which contents of Vol_A are copied to Vol_B when the contents of Vol_A is updated.

In the normal stage, in the case where backup is performed by snapshot, the storage device 10 copies, when the contents of Vol_A is updated upon snapshot being instructed, the contents of Vol_A prior to the update to Vol_B. In contrast, in the case where backup is performed by mirroring, the storage device 10 copies, when the contents of Vol_A is updated, the contents of Vol_A after the update to Vol_B.

Figure 5:
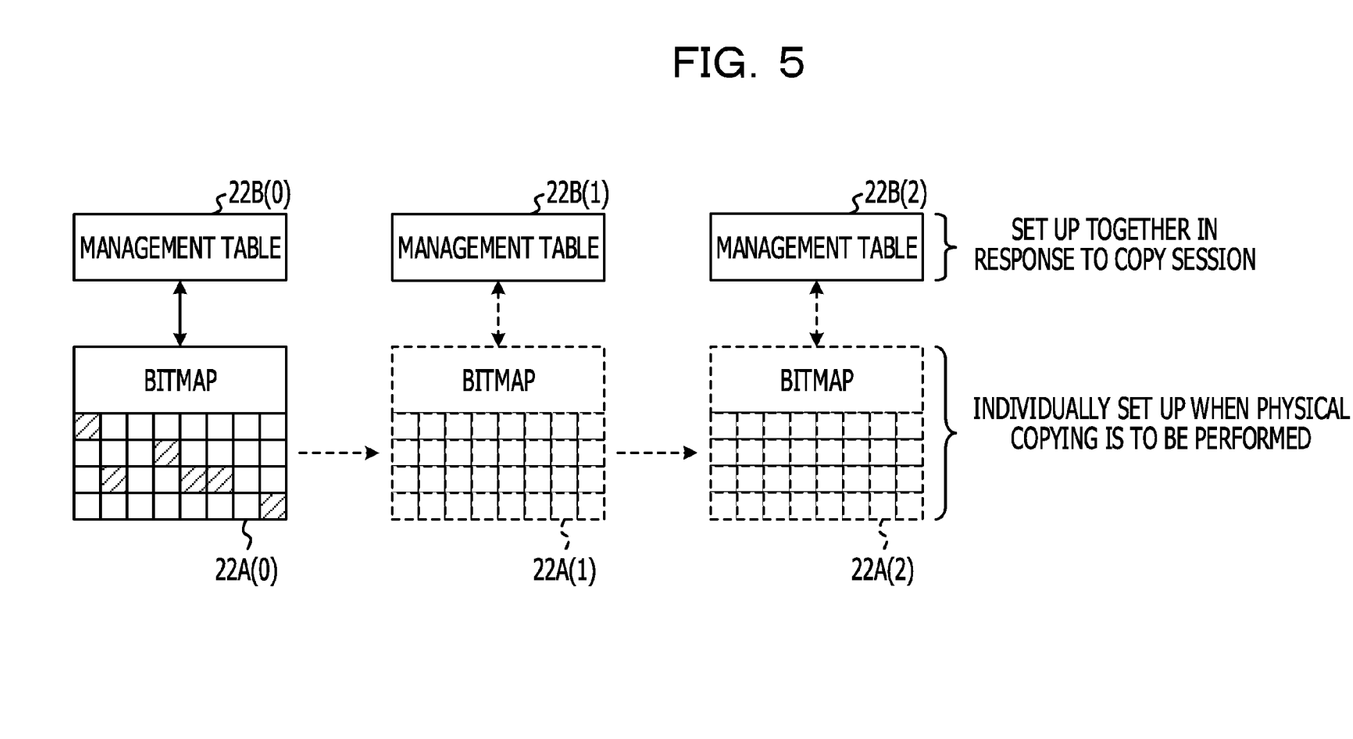
FIG. 5 schematically illustrates a situation in which a plurality of management tables are set up in response to initiation of a copy session and thereafter bitmaps are set up as appropriate.

FIG. 5 schematically illustrates a situation in which a plurality of management tables 22B are set up in response to initiation of a copy session and thereafter bitmaps 22A are set up as appropriate. In FIG. 5, shaded squares for example represent bits with a value of "1". As illustrated in FIG. 5, the management tables 22B are set up for a plurality of copy block groups into which a volume has been divided and bitmaps 22A which correspond to the respective copy block groups are set up as appropriate. Since management tables 22B are set up for a plurality of copy block groups, the previous address 22Ba and the next address 22Bb are set in each management table 22B in order to identify a preceding management table 22B and a succeeding management table 22B for each management table 22B.

The bitmap availability information 22Bd is information indicating a state in which a bitmap 22A corresponding to the management table 22B has been set up (bitmap available) or a state in which it has not been set up (bitmap not available). A "state in which a bitmap 22A has been set up" refers to an exclusive state in which a memory region for the bitmap has secured in the memory 22 and the region is not to be released for any other use.

A bit state 22Be having a value of 0 indicates that copying of all copy blocks included in the corresponding copy block group has been performed, whereas a value of 1 indicates that copying of all copy blocks included in the corresponding copy block group has not yet been performed. Accordingly, the bit state 22Be possesses meaning in the case where the bitmap availability information indicates "not available" and is used as information that indicates the value to be set in all the bits of the bitmap 22A when subsequently setting up the bitmap 22A for the corresponding copy block group.

Figure 6:
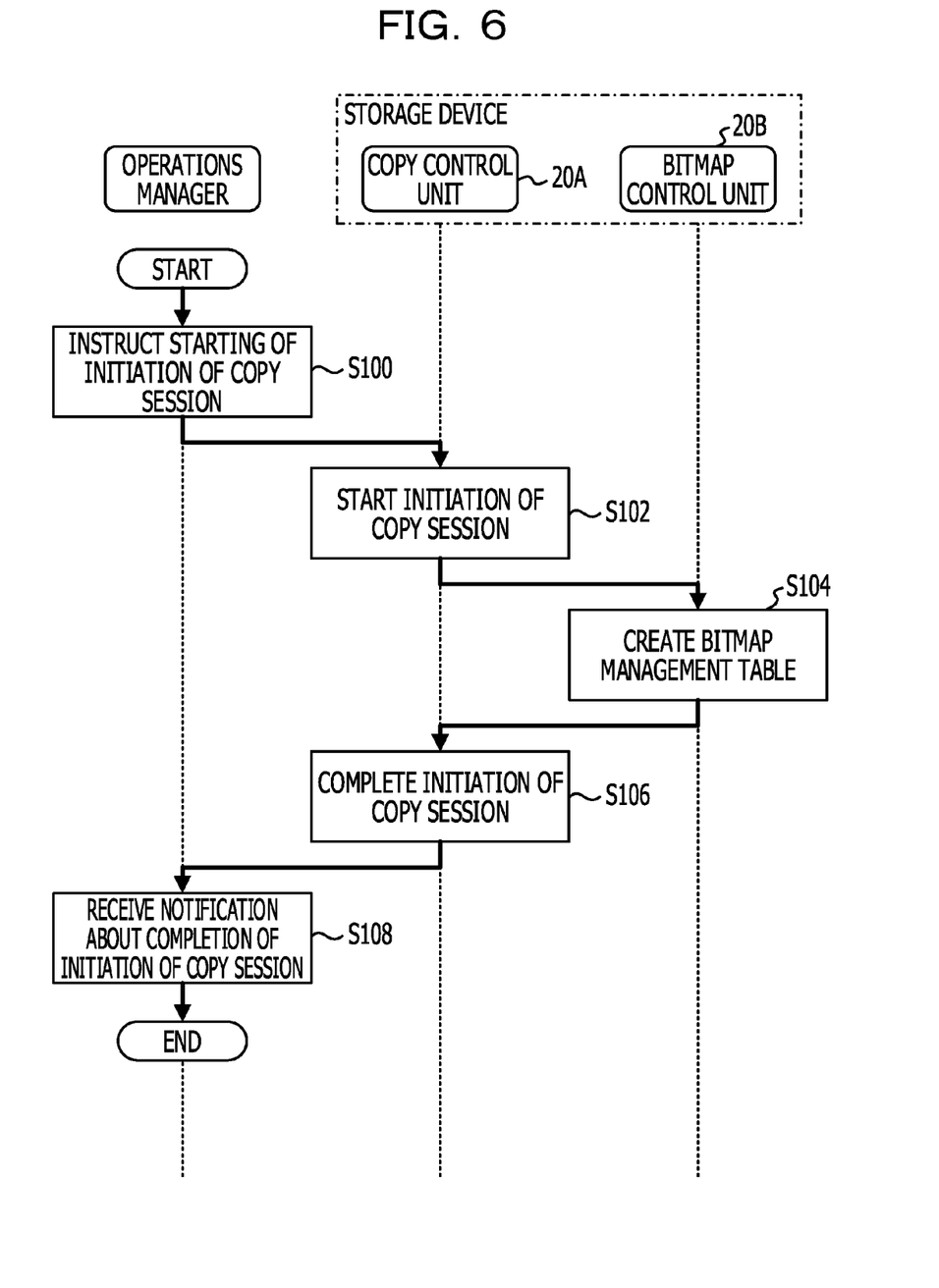
FIG. 6 is an exemplary sequence diagram illustrating a flow of processing executed by a storage device when a copy session is initiated.

FIG. 6 is an exemplary sequence diagram illustrating the flow of processing executed by the storage device 10 when a copy session is initiated. A "session" corresponds to one command which is received from for example the host 50 and which includes for example specification of a region.

First, an operations manager of the host 50 or others instructs starting of initiation of a copy session (S100).

Next, the copy control unit 20A starts initiation of the copy session (S102), the bitmap control unit 20B creates a management table 22B and sets it up in the memory 22 (S104) and the copy control unit 20A completes initiation of the copy session (S106).

Next, the operations manager of the host 50 or others is notified that initiation of the copy session has been completed (S108) and the processing of the sequence diagram of FIG. 6 is completed.

As described above, the storage device 10, for example, performs copying in an initial stage in which all of the contents of Vol_A are initially copied to Vol_B as a backup and in a normal stage in which contents of Vol_A are copied to Vol_B when the contents of Vol_A is updated.

In the "initial stage", the bitmap control unit 20B sets the bitmap availability information 22Bd to "not available" and the bit state 22Be to "1" for every copy block group managed by the management tables 22B.

(Process_A) The bitmap control unit 20B secures a region for a bitmap 22A in the memory 22. When copying is started for each copy block group, the bitmap control unit 20B sets up a bitmap 22A in which all of the bits are "1" since the bit state 22Be is "1". The bitmap control unit 20B sets the bitmap availability information 22Bd to "available".

(Process_B) Then, the bitmap control unit 20B sets the corresponding bit of the bitmap 22A to "0" when copying of each block by the copy control unit 20A has been completed. When all of the bits of the bitmap 22A have become "0", the bitmap control unit 20B sets the bitmap availability information 22Bd to "not available", sets the bit state 22Be to "0" and releases the memory region for the bitmap 22A.

The bitmap control unit 20B performs the processing of Process_A and Process_B for each copy block group and when the processing of Process_A and Process_B has been completed for all of the target copy block groups, the processing of the "initial stage" is completed.

In the "normal stage", when writing (data updating) for a copy block group having a corresponding management table 22B occurs, the bitmap control unit 20B refers to the corresponding management table 22B.

(Process_C) In the case where the bitmap availability information 22Bd is "not available" and the bit state 22Be is "0", the bitmap control unit 20B secures a region for a bitmap 22A in the memory 22 and sets up a bitmap 22A in which all of the bits are "0" since the bit state 22Be is "0". Then, the bitmap control unit 20B sets the bitmap availability information 22Bd to "available" and sets the bits, which correspond to copy blocks that are targets of writing, in the bitmap 22A to "1" and starts copying for each copy block. When the copying of a copy block has been completed, the bitmap control unit 20B sets the bit corresponding to the copy block to "0" in the bitmap 22A. When all of the bits of the bitmap 22A have become "0", the bitmap control unit 20B sets the bitmap availability information 22Bd to "not available" and releases the memory region for the bitmap 22A.

The processing of this embodiment may also be applied to Snap OPC and Snap OPC+ methods.

Snap OPC and Snap OPC+ are methods in which copying of a copy source volume is realized without allocating the same capacity as the copy source volume as a region for the copy destination volume. A virtual volume having a disk capacity smaller than the capacity of the copy source volume is prepared in the copy destination volume. This virtual volume may be logically accessed similarly to a normal volume from for example the host 50. In the case where Snap OPC+ is executed, the storage device 10 does not copy the entirety of the work volume. Rather, when update is made to a work volume, the storage device 10 copies data existed before the update in the updated portion of the work volume to the copy destination volume. In the case where access is made to the copy destination volume from for example the host 50, if an access target region has not yet been copied, data of a region corresponding to the access target region in the copy source volume is referred to instead of the access target region by the host 50 or the like.

In the case where Snap OPC or Snap OPC+ is executed, copying is not performed at the time of initiation of a copy session. Consequently, in the "initial stage", the bitmap control unit 20B sets the bitmap availability information 22Bd to "not available" and the bit state 22Be to "1" for every copy block group managed by management tables 22B. When writing (data updating) for a copy block group for which a management table 22B exists occurs in the "normal stage", the bitmap control unit 20B secures a region for a bitmap 22A in the memory 22 and sets up a bitmap 22A in which all the bits are "1". Then, the bitmap control unit 20B sets the bitmap availability information 22Bd to "available". After that, the bitmap control unit 20B, similarly to as in the processing of Process_C described above, sets the bit corresponding to a copy block to "0" in the bitmap 22A when the copying of the copy block has been completed.

Figure 7:
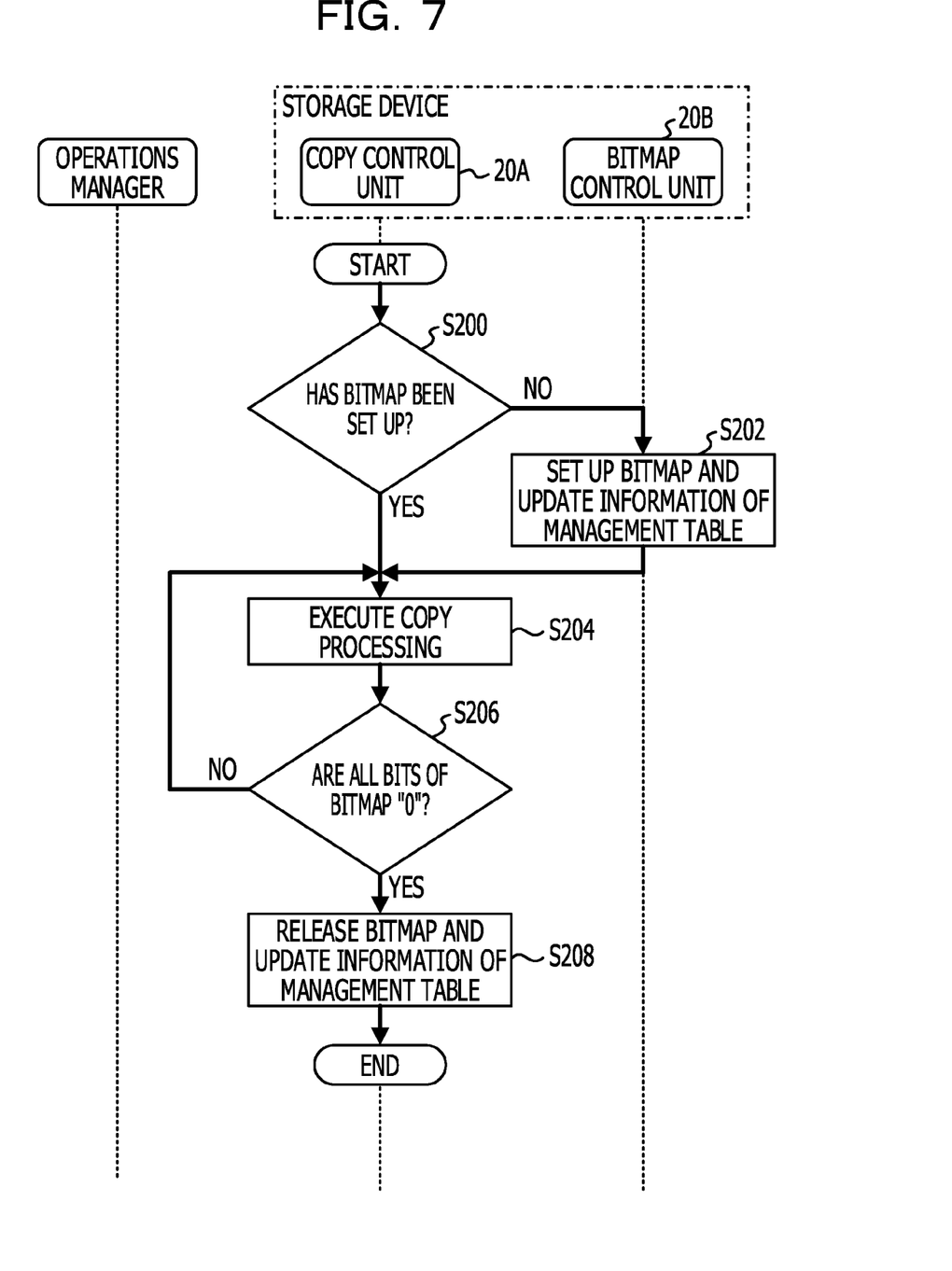
FIG. 7 is an exemplary sequence diagram illustrating a flow of processing executed by a storage device after a copy session has been initiated.

FIG. 7 is an exemplary sequence diagram illustrating the flow of processing executed by the storage device 10 after a copy session is initiated.

First, the copy control unit 20A refers to the management table 22B and determines whether or not a bitmap 22A has been set up (S200). In the case where a bitmap 22A has not been set up, the bitmap control unit 20B secures a memory region for a bitmap 22A, sets up a bitmap 22A and updates the information of the management table 22B (S202).

Next, the copy control unit 20A executes copy processing until all of the bits of the bitmap 22A become "0" (S204, S206). When all of the bits of the bitmap 22A have become "0", the bitmap control unit 20B releases the bitmap 22A and updates the information of the management table 22B (S208).

According to the storage system 1 of this embodiment described above, a management table 22B is set up in the memory 22 and a bitmap 22A corresponding to the regions that are to be copied is set up on the basis of information stored in the management table 22B and therefore use of resources may be reduced.

In the storage system of a related art, a bitmap is set up for each region to be copied in a session at the time when the copy session is initiated. In particular, in a storage system that performs mirroring, bitmaps are usually set up for all of the copy block groups that are targets of copying and therefore the memory region used for the bitmaps is larger than in the storage system 1 according to this embodiment. In contrast, in the storage system 1 according to this embodiment, as illustrated in FIG. 5, bitmaps 22A are set up as appropriate after setting up a plurality of management tables 22B and the bitmaps 22A are released when all of the bits thereof have become "0". As a result, in the storage system 1 of this embodiment, use of resources (memory regions) may be reduced.

Figure 8:
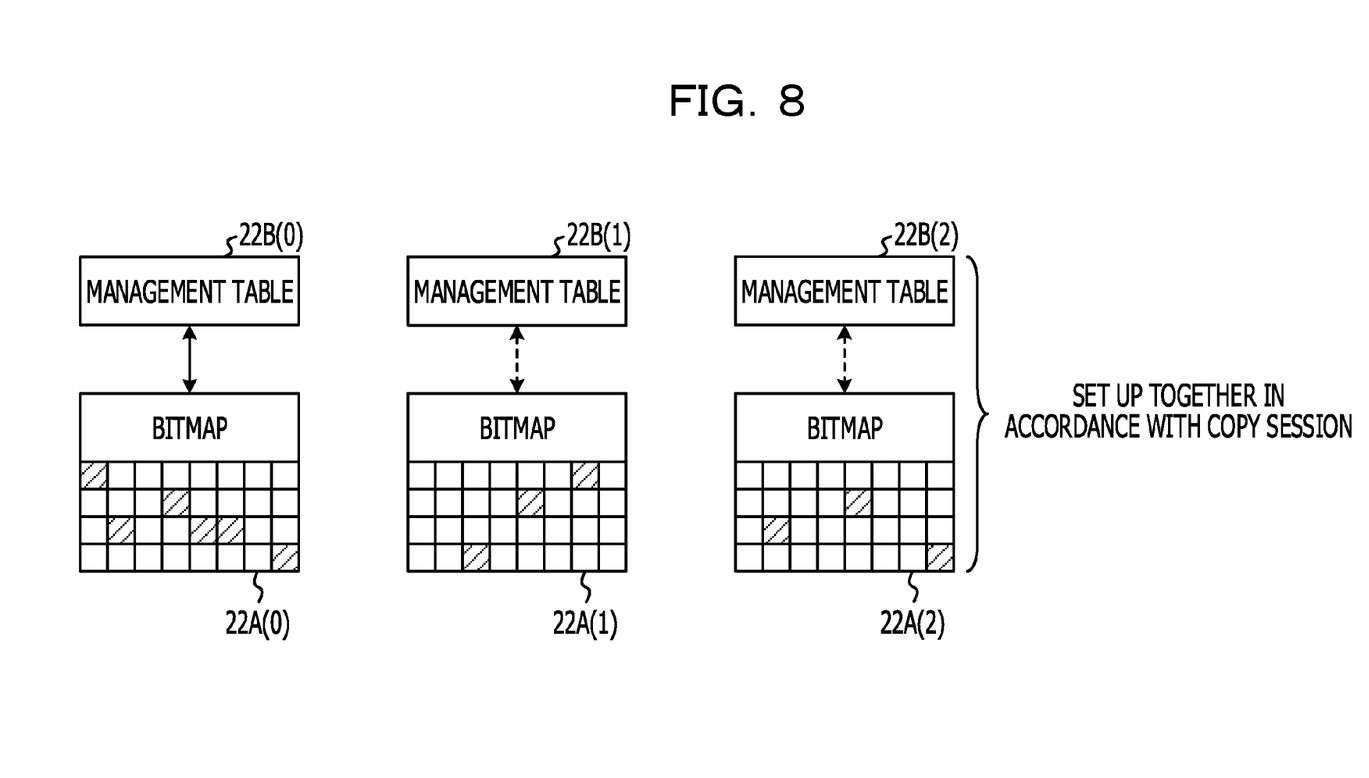
FIG. 8 schematically illustrates a situation in which a plurality of management tables and bitmaps are set up in response to initiation of a copy session in a storage system of a related art.

In a storage system that performs snapshot, a bitmap is also set up for each of a plurality of copy block groups when a copy session is initiated for the plurality of copy block groups. FIG. 8 schematically illustrates a situation in which a plurality of management tables and bitmaps are set up in response to initiation of a copy session in a storage system of a related art. In contrast, in the storage system 1 according to this embodiment, as illustrated in FIG. 5, bitmaps 22A are set up as appropriate after setting up a plurality of management tables 22B, and the bitmaps 22A are released when all of the bits thereof have become "0". As a result, in the storage system 1 of this embodiment, use of resources (memory regions) may be reduced.

As a result, in the storage system 1 of this embodiment, "small start" may be performed in which the memory capacity of a device is initially set to be small when the device is first installed and the memory capacity is increased over time as the scale of business operations increases.

In addition, in the case of application to a system executing Snap OPC or Snap OPC+, a bitmap 22A is not set up at the time of initiation of a copy session and therefore use of resources may be further reduced. On the other hand, when the system has been operated over time and bitmaps 22A have been set up for regions that have been updated, the memory may become insufficient. In order to avoid this problem, a mechanism may be prepared which outputs a message when memory of a preset fixed capacity has been used. Upon acknowledging such a message, the user may avoid the occurrence of insufficient memory by increasing the memory capacity that may be used for bitmaps 22A. Alternatively, the storage device 10 may automatically newly acquire memory for bitmaps 22A when memory of a preset fixed capacity has been used.

According to the storage system 1 of this embodiment, the memory region used for bitmaps 22A is reduced, whereby for example a copy capacity allowed to be set in a single copy session may be increased.

The bitmap availability information 22Bd, for example, is an example of "first information" and the bit state 22Be is an example of "second information".

Above, an embodiment has been described, but the embodiment is in no way limiting and various modifications and substitutions are possible so long as they do not depart from the gist of the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data storage device comprising:
   a processor or hardware circuit to
   copy data stored in regions of a copy source volume to a copy destination volume,
   set up in a memory a management table for the regions, the management table including first information and second information, the first information indicating whether a bitmap has been set up, the bitmap representing a state of progress of the copy, the second information specifying a bit value to be used when setting up the bitmap, and
   set up in the memory the bitmap corresponding to the regions on the basis of the second information.

2. The data storage device according to claim 1, wherein the processor or hardware circuit releases the bitmap when the bitmap indicates that the copy has been completed.

3. A method of controlling a data storage device, the method comprising:
   copying, by the data storage device, data stored in regions of a copy source volume to a copy destination volume;
   setting up in a memory a management table for the regions, the management table including first information and second information, the first information indicating whether a bitmap has been set up, the bitmap representing a state of progress of the copy, the second information specifying a bit value to be used when setting up the bitmap; and
   setting up in the memory the bitmap corresponding to the regions on the basis of the second information.

4. The method according to claim 3, further comprising:
   releasing the bitmap when the bitmap indicates that the copy has been completed.

5. A non-transitory computer-readable recording medium storing a program that causes a computer to execute a procedure, the procedure comprising:
   copying data stored in regions of a copy source volume to a copy destination volume;
   setting up in a memory a management table for the regions, the management table including first information and second information, the first information indicating whether a bitmap has been set up, the bitmap representing a state of progress of the copy, the second information specifying a bit value to be used when setting up the bitmap; and
   setting up in the memory the bitmap corresponding to the regions on the basis of the second information.

6. The non-transitory computer-readable recording medium according to claim 5, the procedure further comprising:
   releasing the bitmap when the bitmap indicates that the copy has been completed.

* * * * *